United States Patent
Gerst et al.

(10) Patent No.: US 7,323,242 B2
(45) Date of Patent: Jan. 29, 2008

(54) THERMALLY CURABLE BINDING AGENTS

(75) Inventors: Matthias Gerst, Neustadt (DE);
Matthias Laubender, Schifferstadt (DE); Bernd Reck, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 497 days.

(21) Appl. No.: 10/491,899

(22) PCT Filed: Oct. 18, 2002

(86) PCT No.: PCT/EP02/11672

§ 371 (c)(1),
(2), (4) Date: Sep. 2, 2004

(87) PCT Pub. No.: WO03/035778

PCT Pub. Date: May 1, 2003

(65) Prior Publication Data

US 2005/0004309 A1    Jan. 6, 2005

(30) Foreign Application Priority Data

Oct. 23, 2001 (DE) ............................. 101 51 569

(51) Int. Cl.
*B32B 27/04* (2006.01)
*C08L 33/00* (2006.01)
*C08L 33/02* (2006.01)
*C08L 63/00* (2006.01)

(52) U.S. Cl. .................. 428/297.4; 525/107; 525/108; 525/109; 525/119; 525/529; 525/530; 525/531; 525/532; 525/533

(58) Field of Classification Search .......... 523/400, 523/402, 406–409, 412, 413, 423, 436–438; 525/55, 107–109, 112, 118–122, 523, 529–533; 428/297.4, 413

See application file for complete search history.

(56) References Cited

U.S. PATENT DOCUMENTS

| 4,727,097 A |   | 2/1988 | Kobayashi et al. |
| 5,068,266 A | * | 11/1991 | Kojima et al. ............... 523/336 |
| 5,290,857 A |   | 3/1994 | Ashida et al. |
| 5,990,228 A |   | 11/1999 | Eichman et al. |

FOREIGN PATENT DOCUMENTS

| DE | 199 49 592 |   | 4/2001 |
| EP | 0 445 578 |   | 9/1991 |
| EP | 0 507 634 |   | 10/1992 |
| EP | 0 576 128 |   | 12/1993 |
| EP | 0 583 086 |   | 2/1994 |
| EP | 0 619 341 |   | 10/1994 |
| EP | 0 854 153 |   | 7/1998 |
| JP | 2001-200245 | * | 7/2001 |
| WO | 97/31036 |   | 8/1997 |
| WO | 97/31059 |   | 8/1997 |

OTHER PUBLICATIONS

Machine translation of JP 2001-200245, provided by the JPO website.*

* cited by examiner

*Primary Examiner*—Michael J. Feely
(74) *Attorney, Agent, or Firm*—Oblon, Spivak, McClelland, Maier & Neustadt, P.C.

(57) ABSTRACT

A heat-curable binder based on an aqueous polymer dispersion comprising an emulsion polymer (EP), a polymer composed of at least 5% by weight of an ethylenically unsaturated monocarboxylic acid, dicarboxylic acid or dicarboxylic anhydride (acid polymer SP for short), and monofunctional or polyfunctional epoxide compounds as curatives. The monofunctional or polyfunctional epoxide compound is stirred, preferably in the liquid state, into the aqueous polymer dispersion. Besides the epoxide compound, the heat-curable binder may further comprise a polyol or an alkanolamine as hardener.

17 Claims, No Drawings

THERMALLY CURABLE BINDING AGENTS

BACKGROUND OF THE INVENTION

1. Field of the Invention

The present invention relates to a heat-curable binder based on an aqueous polymer dispersion comprising
- an emulsion polymer (EP),
- a polymer composed of at least 5% by weight of an ethylenically unsaturated monocarboxylic acid, dicarboxylic acid or dicarboxylic anhydride (acid polymer SP for short), and
- monofunctional or polyfunctional epoxide compounds as curatives.

The present invention further relates to a process for preparing the heat-curable binders based on an aqueous polymer dispersion and to their use as binders for moldings or nonwovens formed from fibrous or particulate materials.

2. Description of the Background

Heat-curable binders formed from polycarboxylic acids and polyols and/or alkanolamines are known, for example, from EP-A 445578, EP-A 583086, EP-A 882074, EP-A 882093 or DE-A 19949592.

EP-A 882074 and DE-A 19949592 specify, inter alia, alkoxysilanes as possible additives and curatives for such binders. As further additives and curatives for binders formed from polycarboxylic acids and polyols, EP-A 445578 discloses, inter alia, polyfunctional amines.

EP-A 576 128 describes adhesive compositions which comprise an acid-rich polymer component and a low-acid polymer component. The acid-rich polymer component is based on a monomeric mixture of from 40 to 95% of an alkyl acrylate or methacrylate and from 5 to 60% of an ethylenically unsaturated acid, such as acrylic acid or methacrylic acid. The low-acid polymer component is based on a monomer mixture of from 90 to 100% of an alkyl acrylate or alkyl methacrylate and from 0 to 10% of an ethylenically unsaturated acid. The composition is prepared by aqueous emulsion polymerization, the acid-rich polymer component being polymerized in the presence of the low-acid polymer component or vice versa. The pH of the composition is adjusted to the desired level by adding ammonium hydroxide or sodium hydroxide. The composition can be used as a pressure sensitive adhesive, laminating adhesive, adhesive for textiles, nonwovens, and packaging, and as wood glue.

SUMMARY OF THE INVENTION

It is an object of the present invention to provide heat-curable binders which are an improvement on the existing heat-curable binders and which are suitable, among other things, for significantly increasing the strength of the moldings obtained from them, and which feature a significantly reduced water absorption and solvent absorption and also have significantly decreased leaching losses. At the same time the binders of the invention are to be obtainable by an extremely simple and economic process and are to have an extremely low curing temperature.

The invention accordingly provides a heat-curable binder based on an aqueous polymer dispersion comprising
- an emulsion polymer (EP),
- a polymer composed of at least 5% by weight of an ethylenically unsaturated monocarboxylic acid, dicarboxylic acid or dicarboxylic anhydride (acid polymer SP for short), and
- monofunctional or polyfunctional epoxide compounds as curatives.

DETAILED DESCRIPTION OF THE PREFERRED EMBODIMENTS

The invention further provides a process for preparing the heat-curable binders of the invention, and also provides for their use as binders for moldings or nonwovens formed from fibrous or particulate materials.

The emulsion polymer (EP) is preferably composed of at least 40% by weight, with particular preference at least 60% by weight, with very particular preference at least 80% by weight, of what are known as principal monomers.

The principal monomers are selected from $C_1$-$C_{20}$ alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and 1 or 2 double bonds, and mixtures of these monomers.

Examples include alkyl (meth)acrylates having a $C_1$-$C_{10}$ alkyl radical, such as methyl methacrylate, methyl acrylate, n-butyl acrylate, ethyl acrylate, and 2-ethylhexyl acrylate.

In particular, mixtures of the alkyl (meth)acrylates are also suitable.

Vinyl esters of carboxylic acids having from 1 to 20 carbon atoms are, for example, vinyl laurate, vinyl stearate, vinyl propionate, Versatic acid vinyl esters, and vinyl acetate.

Suitable vinylaromatic compounds include vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers include vinyl methyl ether and vinyl isobutyl ether. Preference is given to vinyl ethers of alcohols containing 1 to 4 carbon atoms.

Hydrocarbons having 2 to 8 carbon atoms and two olefinic double bonds include butadiene, isoprene, and chloroprene, those containing one double bond, for example, ethylene or propylene.

Preferred principal monomers are the $C_1$ to $C_{10}$ alkyl acrylates and methacrylates, especially $C_1$ to $C_8$ alkyl acrylates and methacrylates. Also suitable, preferably, are mixtures of $C_1$-$C_{10}$ alkyl acrylates or $C_1$-$C_{10}$ alkyl methacrylates with vinylaromatics, especially styrene.

Very particular preference is given to methyl acrylate, methyl methacrylate, ethyl acrylate, n-butyl acrylate, n-hexyl acrylate, octyl acrylate, and 2-ethylhexyl acrylate, styrene, and mixtures of these monomers.

Besides the principal monomers the free-radically polymerized polymer may contain further monomers, e.g., monomers containing carboxylic acid, sulfonic acid or phosphonic acid groups. Carboxylic acid groups are preferred. Examples that may be mentioned include acrylic acid, methacrylic acid, itaconic acid, maleic acid, and fumaric acid.

Further monomers are also, for example, hydroxyl-containing monomers, especially $C_1$-$C_{10}$ hydroxyalkyl (meth) acrylates, such as hydroxyethyl acrylate, for example, and also (meth)acrylamides.

More further monomers that may be mentioned include phenyloxyethyl glycol mono(meth)acrylate, glycidyl acrylate, glycidyl methacrylate, and amino (meth)acrylates such as 2-aminoethyl (meth)acrylate.

Crosslinking monomers are among other further monomers that may be mentioned.

Moreover, mention may also be made of monomers containing hydrolyzable Si groups.

The fraction of monomers containing carboxylic acid groups or carboxylic anhydride groups is generally less than 10% by weight, in particular less than 5% by weight, based on EP.

EP is prepared by emulsion polymerization.

For the emulsion polymerization it is possible to use ionic and/or nonionic emulsifiers and/or protective colloids or stabilizers as surface-active compounds.

A detailed description of suitable protective colloids is given in Houben-Weyl, Methoden der organischen Chemie, Volume XIV/1, Makromolekulare Stoffe, Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of the protective colloids, are normally below 2000 g/mol. In the case where mixtures of surface-active substances are used, the individual components must of course be compatible with one another, something which can be checked in case of doubt by means of a few preliminary tests. It is preferred to use anionic and nonionic emulsifiers as surface-active substances. Examples of customary accompanying emulsifiers are ethoxylated fatty alcohols (EO units: 3 to 50, alkyl: $C_8$ to $C_{36}$), ethoxylated mono-, di- and trialkylphenols (EO units: 3 to 50, alkyl: $C_4$ to $C_9$), alkali metal salts of dialkyl esters of sulfosuccinic acid, and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Further suitable emulsifiers are compounds of the formula I

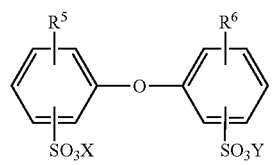

(I)

in which $R^5$ and $R^6$ are hydrogen or $C_4$ to $C_{14}$ alkyl and are not simultaneously hydrogen, and X and Y may be alkali metal ions and/or ammonium ions. Preferably, $R^5$ and $R^6$ are linear or branched alkyl radicals having 6 to 18 carbon atoms or hydrogen and in particular have 6, 12 and 16 carbon atoms, $R^5$ and $R^6$ not both simultaneously being hydrogen. X and Y are preferably sodium, potassium or ammonium ions, with sodium being particularly preferred. Particularly advantageous compounds I are those in which X and Y are sodium, $R^5$ is a branched alkyl radical having 12 carbon atoms, and $R^6$ is hydrogen or $R^5$. It is common to use technical-grade mixtures containing from 50 to 90% by weight of the monoalkylated product, an example being Dowfax® 2A1 (trade mark of the Dow Chemical Company).

Suitable emulsifiers are also given in Houben-Weyl, Methoden der organischen Chemie, Volume 14/1, Makromolekulare Stoffe, Georg Thieme Verlag, Stuttgart, 1961, pages 192 to 208.

Examples of emulsifier trade names include Dowfax® 2A1, Emulan® NP 50, Dextrol® OC 50, Ermulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, and Emulphor NPS 25.

The surface-active substance is commonly used in amounts of from 0.1 to 10% by weight, based on the monomers to be polymerized.

Water-soluble initiators for the emulsion polymerization are, for example, ammonium salts and alkali metal salts of peroxodisulfuric acid, e.g., sodium peroxodisulfate, hydrogen peroxide or organic peroxides, e.g., tert-butyl hydroperoxide.

Also suitable are what are known as reduction-oxidation (redox) initiator systems.

The redox initiator systems are composed of at least one usually inorganic reducing agent and an organic or inorganic oxidizing agent.

The oxidation component comprises, for example, the emulsion polymerization initiators already mentioned above.

The reduction component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite or reducing agents such as hydroxymethanesulfinic acid and its salts, or ascorbic acid. The redox initiator systems may be used together with soluble metal compounds whose metallic component is able to exist in a plurality of valence states.

Customary redox initiator systems are, for example, ascorbic acid/iron (II) sulfate/sodium peroxodisulfate, tert-butyl hydroperoxide/sodium disulfite, and tert-butyl hydroperoxide/sodium hydroxymethanesulfinate. The individual components, e.g., the reducing component, may also be mixtures, e.g., a mixture of sodium hydroxymethanesulfonate and sodium disulfite.

These compounds are normally employed in the form of aqueous solutions, the lower concentration being determined by the amount of water that is acceptable in the dispersion and the upper concentration by the solubility of the respective compound in water. In general the concentration is from 0.1 to 30% by weight, preferably from 0.5 to 20% by weight, with particular preference from 1.0 to 10% by weight, based on the solution.

The amount of initiators is generally from 0.1 to 10% by weight, preferably from 0.5 to 5% by weight, based on the monomers to be polymerized. It is also possible to use two or more different initiators for the emulsion polymerization.

In the polymerization it is possible to use regulators in amounts, for example, of from 0 to 0.8 part by weight, based on 100 parts by weight of the monomers to be polymerized, the function of these regulators being to lower the molecular mass. Examples of suitable compounds are those containing a thiol group, such as tert-butyl mercaptan, ethylhexylacrylic thioglycolate, mercaptoethanol, mercaptopropyltrimethoxysilane or tert-dodecyl mercaptan.

The emulsion polymerization takes place in general at from 20 to 130° C., preferably from 50 to 90° C. The polymerization medium may consist either of water alone or else of mixtures of water and water-miscible liquids such as methanol. It is preferred to use water alone. The emulsion polymerization may be conducted either as a batch process or in the form of a feed process, which includes staged or gradient procedures. Preference is given to the feed process, in which a portion of the polymerization mixture is introduced as an initial charge, heated to the polymerization temperature and partly polymerized, after which the remainder of the polymerization mixture is supplied to the polymerization zone continuously, in stages or under a concentration gradient, usually by way of two or more spatially separate feed streams, of which one or more contain the monomers in neat or emulsified form, during which the polymerization is maintained. In the polymerization it is also possible to include a polymer seed in the initial charge in order, for example, to set the particle size more effectively.

The manner in which the initiator is added to the polymerization vessel in the course of the free-radical aqueous emulsion polymerization is known to the skilled worker. It may either be included in its entirety in the initial charge to the polymerization vessel or else inserted continuously or in stages at the rate at which it is consumed in the course of the free-radical aqueous emulsion polymerization. In each individual case this will depend both on the chemical nature of the initiator system and on the polymerization temperature. Preferably, one portion is included in the initial charge and the remainder is supplied to the polymerization zone in accordance with the rate of consumption.

In order to remove the residual monomers, it is also common to add initiator after the end of the emulsion polymerization proper, i.e., after a monomer conversion of at least 95%.

In the case of the feed process, the individual components may be added to the reactor from the top, through the side, or from below, through the reactor floor.

In the emulsion polymerization, aqueous dispersions of the polymer are obtained with solids contents of generally from 15 to 75% by weight, preferably from 40 to 75% by weight.

For a high space/time yield of the reactor, dispersions having a very high solids content are preferred. In order to be able to achieve solids contents >60% by weight, a bimodal or polymodal particle size should be established, since otherwise the viscosity becomes too high and the dispersion can no longer be handled. Producing a new particle generation can be effected, for example, by adding seed (EP-A 81083), by adding excess amounts of emulsifier, or by adding miniemulsions. A further advantage associated with the low viscosity at high solids content is the improved coating behavior at high solids contents. One or more new particle generations may be produced at any point in time. This point in time is guided by the particle size distribution which is aimed at for a low viscosity.

The polymer prepared in this way is used preferably in the form of its aqueous dispersion.

The glass transition temperature of the polymeric binder, or of the emulsion polymer, is preferably from −60 to +150° C., with particular preference from −50 to +140° C., and with very particular preference from −4 to +120° C.

The glass transition temperature may be determined in accordance with customary methods such as differential thermal analysis or differential scanning calorimetry (cf., e.g., ASTM 3418/82, midpoint temperature).

Besides the emulsion polymer (EP), the aqueous polymer dispersion comprises monofunctional or polyfunctional epoxide compounds as curatives. In this context use is made preferably of epoxide compounds having a functionality, in particular, of two or three, examples being the corresponding glycidyl ethers. Particularly suitable epoxide compounds include bisphenol A diglycidyl ethers of the formula (II)

Further particularly suitable epoxide compounds include butanediol diglycidyl ether, pentaerythritol triglycidyl ether, neopentyl glycol diglycidyl ether, and hexanediol diglycidyl ether. It is also possible to use water-dispersible epoxide compounds.

Considered generally, the epoxide compounds which can be used include aromatic glycidyl compounds such as the bisphenols A of the formula (II) or their bromo derivatives, and also phenol novolak glycidyl ethers or cresol novolak glycidyl ethers, bisphenol F diglycidyl ethers, glyoxal tetraphenol tetraglycidyl ethers, N,N-diglycidylaniline, p-aminophenol triglycide, and 4,4'-diaminodiphenylmethane tetraglycide.

Further suitable epoxide compounds include cycloaliphatic glycidyl compounds such as, for example, diglycidyl tetrahydrophthalate, diglycidyl hexahydrophthalate or hydrogenated bisphenol A diglycidyl ether or heterocyclic glycidyl compounds such as triglycidyl isocyanurate and also triglycidyl-bis-hydantoin.

Further epoxide compounds which can be used include cycloaliphatic epoxy resins such as 3,4-epoxycyclohexylmethyl 3,4-epoxycyclohexanecarboxylate, bis(3,4-epoxycyclohexylmethyl) adipate or 3-(3',4'-epoxycyclohexyl)-2,4-dioxaspiro[5,5]-8,9-epoxyundecane, and aliphatic epoxy resins such as 1,4-butanediol diglycidyl ether or polypropylene glycol-425 diglycidyl ether.

The epoxide compounds used in accordance with the invention may be stirred into the aqueous polymer dispersion either before or during the polymerization of the constituent monomers of the emulsion polymer, and also after the end of this polymerization. The stirred incorporation of the epoxide compounds may be carried out at temperatures from 10 to 100° C., in particular at temperatures from 10 to 50° C. They are preferably employed as curatives in the liquid state.

The amount of the monofunctional or polyfunctional epoxide compounds in the solids fraction of the binder of the invention, i.e., based on 100 parts by weight of the sum of the emulsion polymer and the acid polymer (EP and SP), is preferably from 0.1 to 50 parts by weight, in particular from 0.2 to 30 parts by weight, with particular preference from 0.5 to 25 parts by weight.

As curative it is possible to use not only individual but also mixtures of different monofunctional or polyfunctional epoxide compounds. Epoxide compounds of this kind are available commercially.

The aqueous polymer dispersion also includes the acid polymer SP defined at the outset.

SP is a free-radically polymerized polymer composed of from 5 to 100% by weight, preferably from 20 to 100% by weight, with particular preference from 40 to 100% by

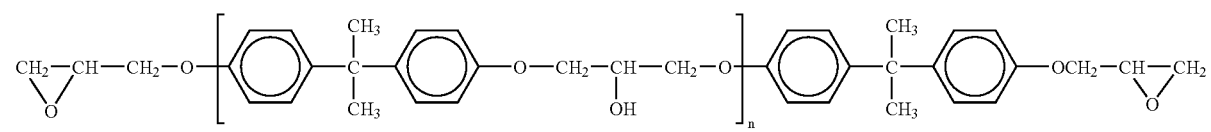

(II)

where n is from 0 to 15.

The corresponding bisphenol A diglycidyl ether derivative where n is 0 is sold, for example, as a commercial product under the name Epicote® 828 by Shell.

weight, of an ethylenically unsaturated acid or an ethylenically unsaturated acid anhydride.

Mention may be made in particular of acrylic acid or methacrylic acid, maleic acid, fumaric acid, itaconic acid, and maleic anhydride.

With particular preference, SP contains acid anhydrides, e.g., maleic anhydride, or dicarboxylic acids which are able to form anhydrides, e.g. maleic acid.

The polymers SP contain in particular from 5 to 50% by weight, preferably from 10 to 40% by weight, of the last-mentioned dicarboxylic acids or acid anhydrides. The other ethylenically unsaturated compounds of which the polymer is composed preferably comprise acrylic acid or methacrylic acid.

The acids may also in principle be present, and used, in the form of salts, e.g., alkali metal salts or ammonium salts. Salts of amines are likewise suitable.

Furthermore, the polymer may also contain the following monomers, for example, as structural components:

$C_1$-$C_8$ alkyl (meth)acrylates, vinyl esters, vinyl ethers, olefins, vinyl halides, unsaturated nitriles, etc.

The aqueous polymer dispersion may further comprise a polyol as crosslinking agent for the polymer SP.

The compounds in question are preferably low molecular mass compounds having a molar weight of below 2000 g/mol, in particular below 1000 g/mol.

Preference is given to polyols having a functionality of from 2 to 5, such as glycerol, trimethylolpropane, etc.

Alkanolamines are particularly preferred. Mention may be made in particular of diethanolamine and triethanolamine. Alkanolamines used with further preference are known, inter alia, from EP-A 902796, whose disclosure content in this respect is part of the present invention's description.

Particularly suitable polymers SP are those as described in EP-A 882074.

SP and polyol crosslinker are preferably used in a ratio to one another which is such that the molar ratio of carboxyl groups to hydroxyl groups is from 20:1 to 1:1, more preferably from 8:1 to 5:1, and with particular preference from 5:1 to 1.7:1 (anhydride groups are in this case counted as two carboxyl groups).

The acid polymer and the polyol may be added to the aqueous dispersion at any desired point in time.

The aqueous polymer dispersion may comprise phosphorous reaction accelerators; preferably, however, it contains no such compounds.

In one particular embodiment, the emulsion polymer is prepared in the presence of at least a portion of the acid polymer SP. In this case SP is preferably composed of
from 50 to 99.5% by weight of at least one ethylenically unsaturated monocarboxylic or dicarboxylic acid or a dicarboxylic anhydride,
from 0.5 to 50% by weight of at least one ethylenically unsaturated compound selected from the esters of ethylenically unsaturated monocarboxylic acids and the monoesters and diesters of ethylenically unsaturated dicarboxylic acids with an amine containing at least one hydroxyl group, and
up to 20% by weight of at least one further monomer.

With particular preference, the emulsion polymerization takes place in the presence of at least 30% by weight, in particular at least 50% by weight, with very particular preference 100% by weight, of the total amount of SP.

The polymer SP contains from 50 to 99.5% by weight, preferably from 70 to 99% by weight, of incorporated structural elements derived from at least one ethylenically unsaturated monocarboxylic or dicarboxylic acid. Within the polymer, if desired, these acids may also be present in whole or in part in the form of a salt. The acidic form is preferred.

Preferably, SP has a solubility in water (at 25° C.) of more than 10 g/l.

Preferred carboxylic acids are $C_3$ to $C_{10}$ monocarboxylic acids and $C_4$ to $C_8$ dicarboxylic acids, especially acrylic acid, methacrylic acid, crotonic acid, fumaric acid, maleic acid, 2-methylmaleic acid and/or itaconic acid. Particular preference is given to acrylic acid, methacrylic acid, maleic acid, and mixtures thereof. In the preparation of the polymer SP it is of course also possible, instead of or together with the acids, to use their anhydrides, such as maleic anhydride, acrylic anhydride or methacrylic anhydride.

The polymer SP further contains in copolymerized form from 0.5 to 50% by weight, preferably from 1 to 30% by weight, of at least one ethylenically unsaturated compound selected from the esters of ethylenically unsaturated monocarboxylic acids and the monoesters and diesters of ethylenically unsaturated dicarboxylic acids with at least one hydroxyl-containing amine.

The polymer SP is preferably present in the form of a comb polymer with covalently bonded amine sidechains.

Monocarboxylic acids suitable for the esters are the abovementioned $C_3$ to $C_{10}$ monocarboxylic acids, especially acrylic acid, methacrylic acid, crotonic acid, and mixtures thereof.

Dicarboxylic acids suitable for the monoesters and diesters are the abovementioned $C_4$ to $C_8$ dicarboxylic acids, especially fumaric acid, maleic acid, 2-methylmaleic acid, itaconic acid, and mixtures thereof.

The amine containing at least one hydroxyl group is preferably selected from secondary and tertiary amines having at least a $C_6$ to $C_{22}$ alkyl, $C_6$ to $C_{22}$ alkenyl, aryl-$C_6$ to $C_{22}$ alkyl or aryl-$C_6$ to $C_{22}$ alkenyl radical, where the alkenyl group may contain 1, 2 or 3 nonadjacent double bonds.

The amine is preferably hydroxyalkylated and/or alkoxylated. Alkoxylated amines preferably have one or two alkylene oxide radicals with terminal hydroxyl groups. The alkylene oxide radicals preferably each have from 1 to 100, more preferably each from 1 to 50, identical or different alkylene oxide units, randomly distributed or in the form of blocks. Preferred alkylene oxides are ethylene oxide, propylene oxide and/or butylene oxide. Ethylene oxide is particularly preferred.

The polymer SP preferably incorporates an unsaturated compound based on an amine component containing at least one amine of the formula

where $R^c$ is $C_6$ to $C_{22}$ alkyl, $C_6$ to $C_{22}$ alkenyl, aryl-$C_6$-$C_{22}$ alkyl or aryl-$C_6$-$C_{22}$ alkenyl, it being possible for the alkenyl radical to have 1, 2 or 3 nonadjacent double bonds, $R^a$ is hydroxy-$C_1$-$C_6$ alkyl or a radical of the formula (III)

$$—(CH_2CH_2O)_x(CH_2CH(CH_3)O)_y—H \qquad (III)$$

where
in the formula (III) the sequence of the alkylene oxide units is arbitrary and x and y independently of one another are integers from 0 to 100, preferably from 0 to 50, the sum of x and y being >1, $R^b$ is hydrogen, $C_1$ to $C_{22}$ alkyl, hydroxy-$C_1$-$C_6$ alkyl, $C_6$ to $C_{22}$ alkenyl, aryl-$C_6$-$C_{22}$ alkyl, aryl-$C_6$-$C_{22}$ alkenyl or $C_5$ to $C_8$ cycloalkyl, it being possible for the alkenyl radical to have 1, 2 or 3 nonadjacent double bonds, or $R^b$ is a radical of the formula (IV)

$$—(CH_2CH_2O)_v(CH_2CH(CH_3)O)_w—H \qquad (IV)$$

where
in the formula (IV) the sequence of the alkylene oxide units is arbitrary and v and w independently of one another are integers from 0 to 100, preferably from 0 to 50.

Preferably $R^c$ is $C_8$ to $C_{20}$ alkyl or $C_8$ to $C_{20}$ alkenyl, it being possible for the alkenyl radical to have 1, 2 or 3 nonadjacent double bonds. $R^c$ is preferably the hydrocarbon radical of a saturated or mono- or polyunsaturated fatty acid. Preferred radicals $R^c$ are, for example, n-octyl, ethylhexyl, undecyl, lauryl, tridecyl, myristyl, pentadecyl, palmityl, margarinyl, stearyl, palmitoleinyl, oleyl and linolyl.

With particular preference, the amine component comprises an alkoxylated fatty amine or an alkoxylated fatty amine mixture. The ethoxylates are particularly preferred. Use is made in particular of alkoxylates of amines based on naturally occurring fatty acids, such as tallow fatty amines, for example, which contain predominantly saturated and unsaturated $C_{14}$, $C_{16}$ and $C_{18}$ alkylamines, or cocoamines, containing saturated, mono- and diunsaturated $C_6$-$C_{22}$, preferably $C_{12}$-$C_{14}$, alkylamines. Amine mixtures suitable for alkoxylation are, for example, various Armeen® grades from Akzo or Noram® grades from Ceca.

Examples of suitable commercially available alkoxylated amines are the Noramox® grades from Ceca, preferably ethoxylated oleyl-amines, such as Noramox® 05 (5 EO units), and the products from BASF AG marketed under the brand name Lutensol®FA.

Copolymerization of the abovementioned esters, monoesters and diesters generally brings about pronounced stabilization of a polymer dispersion prepared in the presence of SP. The binders of the invention reliably retain their colloidal stability of the latex particles on dilution with water or dilute electrolytes or surfactant solutions.

The esterification for preparing the above-described esters, monoesters and diesters takes place in accordance with customary techniques known to the skilled worker. To prepare esters of unsaturated monocarboxylic acids, the free acids or suitable derivatives, such as anhydrides, halides, e.g., chlorides, and ($C_1$ to $C_4$) alkyl esters may be used. The preparation of monoesters of unsaturated dicarboxylic acids takes place preferably starting from the corresponding dicarboxylic anhydrides. The reaction is preferably effected in the presence of a catalyst, such as a dialkyl titanate or an acid, such as sulfuric acid, toluenesulfonic acid or methanesulfonic acid, for example. The reaction takes place generally at reaction temperatures from 60 to 200° C. In accordance with one appropriate embodiment, the reaction takes place in the presence of an inert gas, such as nitrogen. Water formed during the reaction may be removed from the reaction mixture by means of appropriate measures, such as distillation. The reaction may take place if desired in the presence of customary polymerization inhibitors. Essentially, the esterification reaction may be conducted to completion or just to a partial conversion. If desired, one of the ester components, preferably the hydroxyl-containing amine, may be used in excess. The extent of esterification may be determined by means of infrared spectroscopy.

In one preferred embodiment, the unsaturated esters, monoesters or diesters are prepared and further reacted to the polymers SP without isolation of the esters, the reactions preferably taking place in succession in the same reaction vessel.

To prepare the polymers SP it is preferred to use a reaction product of a dicarboxylic anhydride, preferably maleic anhydride, and one of the above-described hydroxyl-containing amines.

In addition to the carboxylic acid and the ester, monoester and/or diester constituents, the polymer SP may also contain in copolymerized form from 0 to 20% by weight, preferably from 0.1 to 10% by weight, of other monomers. Monomers which may be used are the monomers specified in connection with polymer A1, particular preference being given to vinylaromatic compounds, such as styrene, olefins, ethylene for example, or (meth)acrylic esters such as methyl (meth)acrylate, ethyl (meth)acrylate, n-butyl (meth)acrylate, 2-ethylhexyl (meth)acrylate, and mixtures thereof.

The polymers SP are prepared preferably by free-radical polymerization in bulk or in solution. Examples of suitable solvents for the solvent polymerization are water, water-miscible organic solvents such as alcohols and ketones, examples being methanol, ethanol, n-propanol, isopropanol, n-butanol, acetone, methyl ethyl ketone, etc., and mixtures thereof. Examples of suitable polymerization initiators are peroxides, hydroperoxides, peroxodisulfates, percarbonates, peroxo esters, hydrogen peroxide and azo compounds, as described in more detail above for the preparation of the polymer dispersions of the invention. If desired, the polymers SP may be prepared separately and isolated and/or purified by a conventional method. Preferably, the polymers SP are prepared directly before the preparation of the polymer dispersions of the invention and they are used without isolation for the dispersion polymerization.

The polymers SP may advantageously also be prepared by means of polymer-analogous reaction. For this purpose a polymer incorporating from 80 to 100% by weight of at least one ethylenically unsaturated mono- and/or dicarboxylic acid and from 0 to 20% by weight of the abovementioned other polymers may be reacted with at least one hydroxyl-containing amine.

The weight ratio of polymer EP to polymer SP, based on solids, is preferably in the range from 7:1 to 1:7, in particular from 3:1 to 1:3.

In addition to the polymers EP and SP and the epoxide compounds, the aqueus polymer dispersion may further comprise from 0 to 50% by weight, preferably from 0.1 to 40% by weight, based on the polymer SP, of at least one surface-active, alkoxylated, preferably ethoxylated (EO) or propoxylated (PO), alkylamine.

Preferred alkylamines are the alkylamines of the formula $R^cNR^aR^b$, as defined above, which are also present in the polymer SP, particular preference being given to alkylamines of the formula

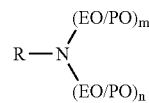

where R is an alkyl, alkenyl or alkylvinyl radical having at least 6 carbon atoms and m and n independently of one another are $\geq 1$. Preferred radicals R have 8 to 22 carbon atoms.

The alkoxylated alkylamines, present in the polymer SP, and the additional alkylamine crosslinkers may be identical or different compounds.

Particularly preferred compositions of the polymer dispersions contain
a) from 70 to 30% by weight of polymer EP,
b) from 30 to 70% by weight of polymer SP, and, if desired,
c) from 0 to 10% by weight of surface-active alkoxylated alkylamine, d) from 0 to 20% by weight of polyol crosslinker,
e) from 0 to 5% by weight of reaction accelerant (in particular, no reaction accelerant), and additionally, based on the weight sum of a) to e), the above-indicated amount of the monofunctional or polyfunctional epoxide compounds.

Further to the abovementioned constituents, customary additives may be added depending on the intended application. The polymer dispersion and the polymer dispersion comprising further additives are referred to collectively below as "composition".

The additional components that may be present in the composition are generally added after the end of the emulsion polymerization.

Furthermore, the compositions may include customary additives, depending on their intended application. Examples which may be present include bactericides or fungicides. Furthermore, they may include hydrophobicizing agents in order to increase the water resistance of the treated substrates. Suitable hydrophobicizing agents are customary aqueous paraffin dispersions or silicones. In addition, the compositions may comprise wetting agents, thickeners, plasticizers, retention agents, pigments, and fillers.

Finally, the compositions of the invention may comprise customary flame retardants, such as aluminum silicates, aluminum hydroxides, borates and/or phosphates, for example.

The compositions may also be used as blends with other binders, such as urea-formaldehyde resins, melamine-formaldehyde resins or phenol-formaldehyde resins, for example.

The compositions are preferably formaldehyde-free. Formaldehyde-free denotes that the compositions contain no substantial amounts of formaldehyde and also that no substantial amounts of formaldehyde are released in the course of drying and/or curing. In general, the compositions contain <100 ppm formaldehyde. They permit the production of moldings with a short curing time, and give the moldings excellent mechanical properties.

Prior to their use, the compositions are essentially uncrosslinked and are therefore thermoplastic. If required, however, a low level of precrosslinking of the polymer EP may be established, by using, for example, monomers having two or more polymerizable groups.

The polymer dispersion or composition may be used as binders for fibrous and particulate substrates, such as, for example, wood chips, wood fibers, textile fibers, glass fibers, mineral fibers or natural fibers such as jute, flax, hemp or sisal, and also cork chips or sand. Curing thereof gives shaped parts having a high mechanical strength, which also retain their dimensional stability under humid conditions. Heat curing is preferred. The curing temperatures are generally from 80 to 250° C., preferably from 100 to 200° C.

On heating, the water in the composition evaporates and the composition cures (hardens). These processes may proceed simultaneously or in succession. By curing in this context is meant the chemical alteration of the composition; for example, crosslinking by formation of covalent bonds between the different constituents of the compositions, formation of ionic interactions and clusters, and formation of hydrogen bonds. Curing may also be accompanied by physical changes within the binder, such as phase rearrangements or phase inversions, for example. An advantage of the heat-curable binder of the invention is that it may be cured at comparatively low temperatures. The duration and temperature of heating influence the degree of cure. The quality of crosslinking may be determined from the leaching loss in water at room temperature (RT). This gives the so-called gel content of the polymer. The gel content of polymer films after 30-minute crosslinking at 130° C. is at least 50%, preferably at least 70%. The degree of crosslinking brought about by the epoxide may be determined by, inter alia, infrared spectroscopy.

Curing may also take place in two or more stages. For example, in a first step the curing temperature and time may be chosen such that the degree of curing attained is low, and substantially complete curing takes place in a second step. This second step may take place in spatial and temporal separation from the first step. By this means, for example, it becomes possible to use the heat-curable binder of the invention to produce semifinished goods which are impregnated with binder and then are shaped and cured at another location.

The invention further provides for the use of the heat-curable binders based on an aqueous polymer dispersion as binders for moldings and nonwovens formed from fibrous or particulate materials with subsequent curing.

Such moldings preferably have a density of from 0.2 to 1.4 g/cm$^3$ at 23° C.

Particularly suitable moldings are sheets and shaped parts having a particular contour. Their thickness is generally at least 1 mm, preferably at least 2 mm, and their surface area is typically from 200 to 200,000 cm$^2$. Consideration may be given, in particular, to wood fiberboards and chipboards, cork boards, cork blocks and cork molds, insulant boards and insulant rolls made, for example, from mineral fibers and glass fibers, interior automotive parts, such as interior door trim, dashboards, and parcel shelves.

The amount by weight of the binder used is generally from 0.5 to 40% by weight, preferably from 1 to 30% by weight (binder solids), based on the substrate (fibers, slivers or chips) from which the molding or nonwoven is then formed.

The fibers, slivers or chips can be coated directly with the binder or mixed with the aqueous binder. The viscosity of the aqueous binder is preferably adjusted to from 10 to 4000, with particular preference to from 30 to 2000 mPas (DIN 53019, rotational viscometer at 250 s$^{-1}$).

The mixture of fibers, slivers and chips and the binder can be subjected to initial drying at temperatures, for example, of from 10 to 150° C. and then to compression molding to form the moldings at temperatures, for example, of from 80 to 250° C., preferably from 100 to 200° C. and under pressures of generally from 2 to 1000 bar, preferably from 10 to 750 bar, with particular preference from 200 to 500 bar.

The binders are particularly suitable for producing woodbase materials such as wood chipboards and wood fiberboards (cf. Ullmanns Encyclopädie der technischen Chemie, 4$^{th}$ edition 1976, volume 12, pp. 709-727), which can be produced by gluing disintegrated wood, such as wood chips and wood fibers, for example. The water resistance of woodbase materials can be enhanced by adding to the binder a customary commercial aqueous paraffin dispersion or other hydrophobicizing agents, or adding said hydrophobicizing agents beforehand or subsequently to the fibers, slivers or chips.

Chipboard production is widely known and is described, for example, in H. J. Deppe, K. Ernst Taschenbuch der Spanplattentechnik, 2$^{nd}$ edition, verlag Leinfelden 1982.

It is preferred to use chips whose average size is from 0.1 to 4 mm, in particular from 0.2 to 2 mm, and which contain less than 6% by weight of water. However, it is also possible to use considerably coarser chips and those with a higher moisture content. The binder is applied with great uniformity to the wood chips, the weight ratio of binder solids to wood chips preferably being from 0.02:1 to 0.3:1. Uniform distribution can be achieved, for example, spraying the binder in finely divided form onto the chips.

The glued wood chips are then scattered out to form a layer with a highly uniform surface, the thickness of the layer being guided by the desired thickness of the finished chipboard. The scattered layer is pressed at a temperature of from 100 to 250° C., for example, preferably from 120 to 225° C., by applying pressures of usually from 10 to 750 bar, to form a board. The required press times may vary within a wide range and are generally from 15 seconds to 30 minutes.

The wood fibers of appropriate quality required to produce medium density fiberboard (MDF) panels from the binders can be produced from barkless wood chips by milling in special mills or refiners at temperatures of about 180° C.

For gluing, the wood fibers are generally swirled up in a stream of air and the binder is introduced through nozzles into the resultant fiber stream (blow-line process). The ratio of wood fiber to binder based on the dry-matter content or solids content is usually from 40:1 to 2:1, preferably from 20:1 to 4:1. The glued fibers are dried in the fiber stream at temperatures of, for example, from 130 to 180° C., scattered out to form a fiber web, and pressed under pressures of from 10 to 50 bar to form boards or moldings.

Alternatively, as described for example in DE-A-2 417 243, the glued wood fibers can be processed to a transportable fiber mat. This intermediate can then be processed further to boards or shaped parts, such as door interior trim panels of motor vehicles, for example, in a second, temporally and spatially separate step.

Other natural fiber substances as well, such as sisal, jute, hemp, flax, coconut, banana and other natural fibers, can be processed with the binders to form boards and shaped parts. The natural fiber materials can also be used in mixtures with plastic fibers, such as polypropylene, polyethylene, polyester, polyamides or polyacrylonitrile. In this case the plastic fibers may also function as cobinders in addition to the binder of the invention. The proportion of plastic fibers in this case is preferably less than 50% by weight, in particular less than 30% by weight and, with very particular preference, less than 10% by weight, based on all chips, slivers or fibers. The fibers can be processed by the method used for the wood fiberboards. Alternatively, preformed natural fiber mats can be impregnated with the binders, with or without the addition of a wetting auxiliary. The impregnated mats, in the binder-moist or predried state, are then pressed at temperatures from 100 to 250° C. under pressures of from 10 to 100 bar, for example, to form boards or shaped parts.

The substrates impregnated with the binders preferably have a residual moisture content on pressing of from 3 to 20% by weight, based on the substrate to be bound.

The moldings obtained feature low water absorption, little increase in thickness (swelling) after storage in water, and good strength, and are formaldehyde-free.

In addition, the compositions can be used as binders for coating materials and impregnating materials for boards made of organic and/or inorganic fibers, nonfibrous mineral fillers, and starch and/or aqueous polymer dispersions. The coating and impregnating materials impart a high flexural modulus to the boards. The production of such boards is known.

Boards of this kind are commonly used as soundproofing panels. The thickness of the panels is usually within the range from about 5 to 30 mm, preferably in the range from 10 to 25 mm. The edge length of the square or rectangular panels is usually in the range from 200 to 2000 mm.

In addition, the compositions may include the auxiliaries customary in coating and impregnating technology. Examples of such auxiliaries are finely divided inert fillers, such as aluminum silicates, quartz, precipitated or pyrogenic silica, light and heavy spar, talc, dolomite or calcium carbonate; color pigments, such as titanium white, zinc white, black iron oxide, etc., foam inhibitors, such as modified dimethylpolysiloxanes, and adhesion promoters, and also preservatives.

The components of the composition are generally present in the coating material in an amount of from 1 to 65% by weight. The proportion of the inert fillers is generally from 0 to 85% by weight, the proportion of water being at least 10% by weight.

The compositions are employed in a customary manner by application to a substrate, for example, by spraying, rolling, pouring or impregnating. The amounts applied, based on the dry-matter content of the composition, are generally from 2 to 100 g/m$^2$.

The amounts of additives to be used are known to the skilled worker and are guided in each individual case by the desired properties and the intended application.

The compositions can also be used as binders for insulating materials made from inorganic fibers, such as mineral fibers and glass fibers. Insulating materials of this kind are produced industrially by spinning melts of the corresponding mineral raw materials; see U.S. Pat. No. 2,550,465, U.S. Pat. No. 2,604,427, U.S. Pat. No. 2,830,648, EP-A-354 913 and EP-A-567 480. The composition is then sprayed onto the freshly produced, still hot inorganic fibers. The water then largely evaporates and the composition remains, in essentially uncured form, adhering as a viscous mass to the fibers. A continuous, binder-containing fiber mat produced in this way is transported on by means of appropriate conveyor belts through a curing oven. In the oven, the mat cures at temperatures in the range from about 100 to 200° C. to form a rigid matrix. After curing, the mats of insulating material are processed appropriately.

The predominant fraction of the mineral fibers or glass fibers used in the insulating materials has a diameter in the range from 0.5 to 20 μm and a length in the range from 0.5 to 10 cm.

The binders of the invention may be used, among other things, in the production of filter papers for air filters and oil filters. They may also be used as components of decorative papers.

The compositions are further suitable as binders for fiber webs.

Examples of fiber webs that may be mentioned are webs of cellulose, cellulose acetate, esters and ethers of cellulose, cotton, hemp, animal fibers, such as wool or hair, and, in particular, webs of synthetic or inorganic fibers, examples being aramid, carbon, polyacrylonitrile, polyester, mineral, PVC, or glass fibers.

In the case of use as binders for fiber webs, the compositions may include, for example, the following additives: silicates, silicones, boron compounds, lubricants, wetting agents.

Preference is given to glass fiber webs. The unbonded fiber webs (untreated fiber webs), especially of glass fibers, are bound, i.e., consolidated, by the binder of the invention.

For this purpose the binder is applied to the untreated fiber web by means, for example, of coating, impregnating or soaking preferably in a weight ratio of fiber to binder (solids) of from 10:1 to 1:1, with particular preference from 6:1 to 3:1.

In this case the binder is used preferably in the form of a diluted aqueous composition containing 95 to 40% by weight of water.

Application of the binder to the untreated fiber web is generally followed by drying and crosslinking at, preferably, from 100 to 400° C., in particular from 130 to 280° C., with very particular preference from 130 to 230° C., over a period of preferably from 10 seconds to 10 minutes, in particular from 10 seconds to 3 minutes.

The bonded fiber web obtained has high strength in the dry and wet states. In particular, the binders of the invention permit short drying times and also low drying temperatures. They may also be dried to a semifinished state allowing later processing.

The bonded fiber webs, especially glass fiber webs, are suitable for use as or in roofing membranes, as base materials for wallpapers, or as inliners or base material for floor coverings made, for example, from PVC.

For use as roofing membranes, the bonded fiber webs are generally coated with bitumen.

The aqueous compositions can also be used to produce foamed boards or moldings. For this purpose the water present in the composition is first of all removed down to a level of <20% by weight at temperatures of <100° C. The viscous composition thus obtained is then foamed at temperatures >100° C., preferably from 120 to 300° C. Examples of blowing agents which can be used are the residual water still present in the mixture and/or the gaseous reaction products that form in the course of the curing reaction. However, commercially customary blowing agents can also be added. The resultant crosslinked polymer foams can be used, for example, for heat insulation and for soundproofing.

The compositions can also be used to produce laminates, for decorative applications, for example, by impregnating paper and then carrying out gentle drying, in accordance with the known processes. In a second step, these laminates are laminated onto the substrate to be coated, under pressure and with heat, the conditions being chosen such that curing of the binder takes place.

In addition, the compositions can be used to produce sandpaper and other abrasives by the production techniques customarily carried out with phenolic resin binders. In the production of sandpapers, a layer of the binders of the invention is first of all applied (judiciously 10 g/m$^2$) as base binder to an appropriate backing paper. The desired amount of particulate abrasive, for example, silicon carbide, corundum, etc., is scattered into the wet base binder. After initial drying, a binder topcoat is applied (e.g., 5 g/m$^2$). The paper coated in this way is then cured by heating at 170° C. for another 5 minutes.

The hardness and flexibility of the composition may be adjusted to the desired level by way of the composition of the polymer SP.

The compositions are suitable, furthermore, as formaldehyde-free sand binders for producing casting molds and cores for metal casting according to conventional thermal hardening processes (E. Flemming, W. Tilch, Formstoffe und Formverfahren, Dt. Verlag für Grundstoffindustrie, Stuttgart, 1993).

They are also suitable as binders for mold insulating boards.

The heat-curable binders of the invention, based on an aqueous polymer dispersion, are distinguished, inter alia, by substantially reduced water absorption and solvent absorption and also by substantially decreased leaching losses. The moldings obtained using the binders of the invention include among their properties that of high strength. The process, likewise of the invention, for preparing the heat-curable binders is simple and economic to carry out.

EXAMPLES

The nonlimiting examples which follow illustrate the invention.

Example 1

A) Preparation of the Acid Polymer SP

A pressure reactor with anchor stirrer is charged with 0.55 kg of deionized water, 0.36 kg of maleic anhydride, and 0.91 kg of a 40% strength by weight aqueous solution of an ethoxylated oleylamine (average degree of ethoxylation=12, from BASF AG). This initial charge is heated to 125° C. under a nitrogen atmosphere. On reaching this temperatures feed stream 1, consisting of 0.75 kg of deionized water and 1.00 kg of acrylic acid, is metered in over the course of 4 h, and feed stream 2, consisting of 0.22 kg of deionized water and 0.12 kg of H$_2$O$_2$ (30% strength by weight), is metered in over the course of 5 h, both feeds being introduced at a uniform rate. After the end of feed stream 1, a further 0.11 kg of deionized water is added. After the end of the reaction, the mixture is cooled to room temperature. The resultant aqueous polymer solution has a solids content of 43.2%, a pH of 1.7, and a viscosity of 450 mPas. The K value is 13.3.

B) Polymer Dispersions (Emulsion Polymerization in the Presence of the Acid Polymer).

Polymer Dispersion with EP1:

A 4 l glass vessel with anchor stirrer (120 rpm) is charged with 640 g of water, 133.1 g of an aqueous solution of the acid polymer SP (43.2% strength by weight) from Example A and 5.35 g (10%) of feedstream 2, and this initial charge is heated to 90° C. After 10 minutes, at this temperature, the remainder of feedstream 1 is metered in over the course of 3 h and the remainder of feedstream 2 over the course of 3.5 h, the feedpoints being spatially separate. Subsequently, polymerization is continued at this temperature for 30 minutes and the reaction mixture is cooled and blended with feedstream 3. The polymer dispersion prepared in this way contains 47.3% by weight nonvolatiles and has a pH of 2.7. The viscosity of the resultant polymer dispersion is 630 mPas (at 250 s$^{-1}$). Finally, 9 parts by weight of triethanolamine (based on the solids content) are added to the dispersion.

| Feedstream 1: |
|---|
| 185.32 g of water |
| 665.51 g of SP (43.2%) |
| 805.00 g of styrene (100%) |
| 287.50 g of MMA (100%) |
| 57.50 g of HEA (100%) |
| Feedstream 2: |
| 619 g of deionized water |
| 3.45 g of sodium peroxodisulfate |
| Feedstream 3: |
| 1863.43 g of SP (43.2%) |

X % by weight of triethanolamine and/or epoxide compound (in accordance with Tables I to V) (triethanolamine and epoxide compound are added at different points in time)

In feedstream 1 above,

MMA: is methyl methacrylate and

HEA: is hydroxyethyl acrylate.

C) Determination of Water Absorption (WA) and Leaching Losses (LL) with Water

The polymer films obtained from B), without and with additives (TEA: triethanolamine; E: Epicote® 828, bisphenol A diglycidyl ether), were dried at room temperature for 3 days and then for a further 3 days at 50° C.

To determine the water absorption (WA) and leaching losses (LL), about 0.2 to 0.3 g of polymer film was stored in 10 g of water for 24 hours.

The polymer film (Acrodur® D100 from BASF Aktiengesellschaft) was composed of 100 parts by weight of SP (made from acrylic acid and maleic anhydride; obtained in section A) and also 70 parts by weight of styrene, 25 parts by weight of methyl methacrylate and 5 parts by weight of hydroxyethyl acrylate (obtained in section B).

The results of Example 1 are given in Table I below.

TABLE I

| Sample | TEA [parts by weight based on binder to be formulated] | E [parts by weight based on binder to be formulated] | WA [%] | LL [%] |
|---|---|---|---|---|
| WA and LL following heat treatment of the polymer film at 80° C. for 30 minutes | | | | |
| 1 | 9 | 0 | 37.7 | 17.5 |
| 2 | 9 | 10 | 30.8 | 9.8 |
| WA and LL following heat treatment of the polymer film at 130° C. for 30 minutes | | | | |
| 1 | 0 | 0 | 33.8 | 4.9 |
| 2 | 0 | 10 | 25.2 | 0.9 |

Example 2

The polymer used was the same acid polymer (SP) as in Example 1. Emulsion polymerization was carried out as in section B of Example 1, in the presence of the SP with 73.5 parts by weight of ethylhexyl acrylate, 21 parts by weight of styrene and 5.5 parts by weight of hydroxyethyl acrylate.

The polymer films obtained in this way without and with additives (TEA: triethanolamine; E: Epicote® 828, bisphenol A diglycidyl ether), were dried at room temperature for 3 days and then for a further 3 days at 50° C.

To determine the water absorption (WA) and leaching losses (LL), about 0.2 to 0.3 g of polymer film was stored in 10 g of water or in 100 g of acetone for 24 hours.

The polymer film was composed of 100 parts by weight of SP (made from acrylic acid and maleic anhydride; obtained in section A) and also 73.5 parts by weight of ethylhexyl acrylate, 21 parts by weight of styrene and 5.5 parts by weight of hydroxyethyl acrylate.

The results of Example 2 are given in Table II below.

TABLE II

| Sample | TEA [parts by weight based on binder to be formulated] | E [% by weight based on binder to be formulated] | WA [%] | LL [%] |
|---|---|---|---|---|
| WA and LL without heat treatment | | | | |
| 1 | 0 | 0 | 61.2 | 23.3 |
| 2 | 0 | 10 | 55.1 | 8.4 |
| 3 | 0 | 20 | 45.9 | 6.2 |
| 4 | 0 | 30 | 42.2 | 6.3 |
| 5 | 9 | 0 | 61.1 | 19.6 |
| 6 | 9 | 10 | 37.6 | 9.6 |
| 7 | 9 | 20 | 35.9 | 8.9 |
| 8 | 9 | 30 | 34.5 | 7.5 |
| WA and LL following heat treatment of the polymer film at 100° C. for 30 minutes | | | | |
| 1 | 0 | 0 | 53.9 | 12.2 |
| 2 | 0 | 10 | 41.9 | 6.3 |
| 3 | 0 | 20 | 36.8 | 4.4 |
| 4 | 0 | 30 | 32 | 3.7 |
| WA and LL following heat treatment of the polymer film at 150° C. for 30 minutes | | | | |
| 1 | 9 | 0 | 14.1 | 1.2 |
| 2 | 9 | 10 | 10.3 | 1.2 |
| 3 | 9 | 20 | 7.9 | 0.7 |

Example 3

The same acid polymer (SP) and the same (in terms of its monomer composition) emulsion polymer (EP) as in Example 2 were used.

The polymer films obtained in this way, without and with additives (TEA: triethanolamine, and/or the epoxide compounds indicated in Table III) were heat-treated first at room temperature for 3 days, then at 50° C. for 3 days more, and, where appropriate, for a further 30 minutes at 100° C. or at 150° C.

The solvent absorption (SA) and leaching losses (LL) in THF (tetrahydrofuran) were determined by storing about 0.5 g of the polymer film in 90 ml of THF for 24 hours. For the LL figure, the polymer films were dried at room temperature for 7 days beforehand and then dried to a constant-weight in a forced air oven at 50° C.

The results of Example 3 are given in Table III below.

TABLE III

| Sample | Triethanolamine [parts by weight based on binder to be formulated] | Epoxide compound [parts by weight based on binder to be formulated] | LL in THF [%] |
|---|---|---|---|
| LL without heat treatment | | | |
| 1 | 0 | 0 | 38.5 |
| 2 | 0 | 30 Epicote 828 | 12.0 |
| 3 | 9 | 0 | 12.2 |
| 4 | 9 | 30 Epicote 828 | 3.7 |

| Sample | Triethanolamine [parts by weight based on binder to be formulated] | Epoxide compound [parts by weight based on binder to be formulated] | AV in THF [%] |
|---|---|---|---|
| AV following heat treatment at 150° C. | | | |
| 1 | 9 | 0 | 8.0 |
| 2 | 9 | 30 Epicote 828 | 2.6 |

TABLE III-continued

| | | | |
|---|---|---|---|
| 3 | 9 | 30 Butanediol diglycidyl ether | 0.6 |
| 4 | 9 | 30 Pentaerythritol triglycidyl ether | 3.4 |
| 5 | 9 | 30 Neopentyl glycol diglycidyl ether | 7.1 |
| 6 | 9 | 30 Hexanediol diglycidyl ether | 5.1 |

Solvent absorption (SA) of THF

| Sample | Triethanolamine [parts by weight based on binder to be formulated] | Heat treatment at X° C. | Epoxide compound [parts by weight based on binder to be formulated] | SA THF [%] |
|---|---|---|---|---|
| 1 | 0 | RT | 0 | 581 |
| 2 | 0 | 100 | 0 | 414 |
| 3 | 0 | 150 | 0 | 202 |
| 4 | 0 | RT | 30 Epicote 828 | 344 |
| 5 | 0 | 100 | 30 Epicote 828 | 285 |
| 6 | 0 | 150 | 30 Epicote 828 | 87 |
| 7 | 9 | 100 | 30 Epicote 828 | 180 |
| 8 | 9 | 150 | 30 Epicote 828 | 121 |
| 9 | 9 | 100 | 30 Butanediol diglycidyl ether | 109 |
| 10 | 9 | 100 | 30 Pentaerythritol triglycidyl ether | 109 |
| 11 | 9 | 100 | 30 Neopentyl glycol diglycidyl ether | 145 |
| 12 | 9 | 100 | 30 Hexanediol diglycidyl ether | 128 |

Example 4

The polymer dispersion obtained in Example 1 was tested for the bending strength (BS) and water absorption (WA) properties it gave to sand test specimens. The bending strength [N/mm$^2$] was determined after 3 hours of water storage at 80° C. The water absorption of the sand test specimens was measured at the same time, in accordance with the following method:

300 g of quartz sand H34 were mixed with the binder compositions at room temperature (5% or 3% by weight of dry binder as per table, based on sand). The moist mixtures are shaped in a corresponding metal mold into test specimens (Fischer bars) measuring 17×2.3×2.3 cm, which are compacted and then, after demolding, are cured in a forced air oven for 2 hours at temperatures as per the table. Compaction is carried out using a ram type PRA from Georg Fischer AG. Prior to testing, the bars were stored for 3 hours in water at 80° C. The water absorption of the bars is then measured while they are still wet (in table, WA after WS).

The bending strength (BS) of the Fischer bars thus produced is determined in the dry state at 23° C. specimen temperature in a strength testing apparatus type PFG with the test device PBV (from Georg Fischer, Schaffhausen/CH) (in table BS after WS).

The results of the tests are given in Table IV below.

TABLE IV

Curing temperature 150° C. for 2 hours

| Sample | TEA [parts by weight based on binder to be formulated] | E [parts by weight based on binder to be formulated] | BS* | WA [%]* |
|---|---|---|---|---|
| 1 | 9 | 0 | 25 | 13.6 |
| 2 | 9 | 10 | 85 | 13.3 |
| 3 | 9 | 20 | 140 | 11.7 |
| 4 | 9 | 30 | 180 | 10.1 |
| 5 | 0 | 30 | 260 | 11.5 |

Curing temperature 170° C. for 2 hours

| Probe | TEA [parts by weight based on binder to be formulated] | E [parts by weight based on binder to be formulated] | BS* | WA [%]* |
|---|---|---|---|---|
| 1 | 9 | 0 | 75 | 13.4 |
| 2 | 0 | 10 | 235 | 13.2 |
| 3 | 9 | 10 | 320 | 9.2 |

The abbreviations here have the following meanings:
TEA: Triethanolamine
E: Epicote® 828 (bisphenol A diglycidyl ether)

Example 5

The polymer dispersions obtained in Examples 1 and 2 were subjected to the following boiling test with a view to their suitability as binders for cork granules:

92.5% by weight of coarse cork, 7.5% by weight of binder; boiling test after 3 hours; duration of pressing: 2 hours.

In a Kenwood laboratory mixer, 100 g of dried cork granules (cleaned and ground cork, average particle size about 8 mm) and 15 g in each case of the 50% strength binder from the cited examples are mixed for 2 minutes. The binder-treated cork particles are introduced without further drying into a two-part metal mold and pressed under a pressure of 100 bar for 2 hours at a pressing temperature of from 80° C. to 100° C. The metal mold has internal dimensions of 15×15 mm, with the bottom and die of the mold perforated with dent holes to take off the water vapor that is released.

Specimens measuring 5×5×3 cm are cut from these rigid cork blocks and their thickness swell is tested under the conditions indicated above.

The results of the cork block boiling test are given in Table V for the polymer dispersion from Example 1 and in Table VI for the polymer dispersion from Example 2.

TABLE V

| Sample | TEA [parts by weight based on binder to be formulated] | E [parts by weight based on binder to be formulated] | Pressing temperature | Swell [%] |
|---|---|---|---|---|
| 1 | 9 | 0 | 80 | fell apart |
| 2 | 9 | 0 | 90 | fell apart |
| 3 | 9 | 0 | 100 | fell apart |
| 4 | 9 | 30 | 80 | 58 |
| 5 | 9 | 30 | 90 | 30 |
| 6 | 9 | 30 | 100 | 24 |

TABLE VI

| Sample | TEA [parts by weight based on binder to be formulated] | E [parts by weight based on binder to be formulated] | Pressing temperature | Swell [%] |
|---|---|---|---|---|
| 1 | 9 | 0 | 80 | fell apart |
| 2 | 9 | 0 | 90 | fell apart |
| 3 | 9 | 0 | 100 | fell apart |
| 4 | 9 | 30 | 80 | 41 |
| 5 | 9 | 30 | 90 | 23 |
| 6 | 9 | 30 | 100 | 23 |

In the above tables, abbreviations have the following meanings:
TEA: Triethanolamine
E: Epicote® 828 (bisphenol A diglycidyl ether)

The invention claimed is:

1. A heat-curable binder based on an aqueous polymer dispersion, said aqueous polymer dispersion comprising:
   an emulsion polymer (EP) prepared by emulsion polymerization of constituent monomers in an aqueous medium, said constituent monomers comprising principle monomers and copolymerizable monomers, which, when comprising monomers containing carboxylic acid groups or carboxylic anhydride groups, the fraction of said monomers containing carboxylic acid groups or carboxylic anhydride groups being less than 5% by weight of the emulsified polymer that is formed;
   an acid polymer (SP) composed of 40 to 100% by weight of an ethylenically unsaturated monocarboxylic acid, an ethylenically unsaturated dicarboxylic acid or an ethylenically unsaturated dicarboxylic anhydride; and
   a curative comprising monofunctional or polyfunctional epoxide compounds and further comprising a curative selected from the group consisting of a polyol having a molecular weight of less than 1000 g/mol and an alkanolamine containing at least two hydroxyl groups.

2. The heat-curable binder as claimed in claim 1, wherein the monofunctional or polyfunctional epoxide compound is employed in the liquid state as curative.

3. The heat-curable binder as claimed in claim 1, wherein a difunctional or trifunctional epoxide compound is employed as curative.

4. The heat-curable binder as claimed in claim 1, wherein the emulsion polymer (EP) is composed of at least 40% by weight of a principal monomer selected from the group consisting of $C_1$ to $C_{20}$ alkyl (meth)acrylates, vinyl esters of carboxylic acids containing up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and one or two double bonds, and mixtures of these monomers.

5. The heat-curable binder as claimed in claim 4, wherein the emulsion polymer (EP) is comprised additionally of at least one monomer which contains a carboxylic acid group, a sulfonic acid group or a phosphonic acid group; a hydroxyl group containing monomer, phenyloxyethyl glycol mono (meth)acrylate, glycidyl acrylate, glycidyl methacrylate, amino (meth)acrylates or a crosslinking monomer.

6. The heat-curable binder as claimed in claim 1, wherein the acid polymer (SP) is comprised of:
   from 50 to 99.5% by weight of at least one ethylenically unsaturated monocarboxylic acid, ethylenically unsaturated dicarboxylic acid, ethylenically unsaturated dicarboxylic anhydride or mixtures thereof,
   from 0.5 to 50% by weight of at least one ethylenically unsaturated compound selected from the group consisting of esters of ethylenically unsaturated monocarboxylic acids and the monoesters and diesters of ethylenically unsaturated dicarboxylic acids with an amine containing at least one hydroxyl group, and
   optionally, up to 20% by weight of at least one additional monomer.

7. The heat-curable binder as claimed in claim 6, wherein the ethylenically unsaturated monocarboxylic acid, ethylenically unsaturated dicarboxylic acid or ethylenically unsaturated dicarboxylic anhydride is (meth)acrylic acid, maleic acid, fumaric acid, itaconic acid or maleic anhydride.

8. The heat-curable binder as claimed in claim 1, wherein the weight ratio of the emulsion polymer (EP) to the acid polymer (SP) based on solids is in the range from 7:1 to 1:7.

9. The heat-curable binder as claimed in claim 1, wherein the epoxy curative is a bisphenol A diglycidyl ether, butanediol diglycidyl ether, pentaerythritol triglycidyl ether, neopentyl glycol diglycidyl ether, or hexanediol diglycidyl ether.

10. The heat-curable binder as claimed in claim 1, wherein the epoxy curative is present in an amount ranging from 0.1 to 50 parts by wt based on 100 parts by wt of the sum of emulsion polymer (EP) and acid polymer (SP).

11. A composite prepared from a fibrous or particulate material combined with the heat-curable binder as claimed in claim 1.

12. A process for preparing an aqueous polymer dispersion, said process comprising the sequential steps of:
   preparing an emulsion polymer (EP) by emulsion polymerization of constituent monomers in an aqueous medium, wherein the emulsion polymerization is performed in the presence of an acid polymer (SP), yielding an aqueous polymer dispersion; and
   stirring a curative into the aqueous polymer dispersion, wherein the curative comprises monofunctional or polyfunctional epoxide compounds;
   wherein the emulsion polymer (EP) is prepared from principle monomers and copolymerizable monomers, which, when comprising monomers containing carboxylic acid groups or carboxylic anhydride groups, the fraction of said monomers containing carboxylic acid groups or carboxylic anhydride groups being less than 5% by weight of the emulsified polymer that is formed; and
   wherein the acid polymer (SP) is composed of 40 to 100% by weight of an ethylenically unsaturated monocarboxylic acid, an ethylenically unsaturated dicarboxylic acid or an ethylenically unsaturated dicarboxylic anhydride.

13. The process as claimed in claim 12, wherein the monofunctional or polyfunctional epoxide compounds are incorporated into the dispersion by stirring at temperatures ranging from 10 to 100° C.

14. The process as claimed in claim 12, wherein the monofunctional or polyfunctional epoxide compounds are further combined with a polyol having a molecular weight of less than 1000 g/mol or an alkanolamine containing at least two hydroxyl groups.

15. A process for preparing an aqueous polymer dispersion, said process comprising:

preparing an emulsion polymer (EP) by emulsion polymerization of constituent monomers in an aqueous medium, wherein the emulsion polymerization is performed in the presence of an acid polymer (SP); and wherein the emulsion polymerization is performed while stirring a curative into the aqueous medium;

wherein the emulsion polymer (EP) is prepared from principle monomers and copolymerizable monomers, which, when comprising monomers containing carboxylic acid groups or carboxylic anhydride groups, the fraction of said monomers containing carboxylic acid groups or carboxylic anhydride groups being less than 5% by weight of the emulsified polymer that is formed;

wherein the acid polymer (SP) is composed of 40 to 100% by weight of an ethylenically unsaturated monocarboxylic acid, an ethylenically unsaturated dicarboxylic acid or an ethylenically unsaturated dicarboxylic anhydride; and wherein the curative comprises monofunctional or polyfunctional epoxide compounds.

16. The process as claimed in claim 15, wherein the monofunctional or polyfunctional epoxide compounds are incorporated into the aqueous medium by stirring at temperatures ranging from 10 to 100° C.

17. The process as claimed in claim 15, wherein the monofunctional or polyfunctional epoxide compounds are further combined with a polyol having a molecular weight of less than 1000 g/mol or an alkanolamine containing at least two hydroxyl groups.

* * * * *